Aug. 23, 1966     G. L. HOBROUGH ETAL     3,267,798

SUPPORT AND TRANSPORT SYSTEM

Filed Oct. 4, 1963     4 Sheets-Sheet 1

FIG-1

INVENTORS
GILBERT L. HOBROUGH
GEORGE A. WOOD
BY *Stanley Belsky*
*Bialos & Schlemmer*

ATTORNEYS

Aug. 23, 1966　　　G. L. HOBROUGH ETAL　　　3,267,798
SUPPORT AND TRANSPORT SYSTEM
Filed Oct. 4, 1963　　　　　　　　　　　　　　4 Sheets-Sheet 2

FIG-2

INVENTORS
GILBERT L. HOBROUGH
GEORGE A. WOOD
BY Stanley Bilsky
Bialos & Schlemmer
ATTORNEYS Aug. 23, 1966    G. L. HOBROUGH ETAL    3,267,798
SUPPORT AND TRANSPORT SYSTEM Filed Oct. 4, 1963    4 Sheets-Sheet 4

INVENTORS
GILBERT L. HOBROUGH
GEORGE A. WOOD
BY
ATTORNEYS

United States Patent Office 3,267,798
Patented August 23, 1966

3,267,798
SUPPORT AND TRANSPORT SYSTEM
Gilbert L. Hobrough and George A. Wood, Los Altos, Calif., assignors to Itek Corporation, Lexington, Mass., a corporation of Delaware
Filed Oct. 4, 1963, Ser. No. 313,882
32 Claims. (Cl. 88—24)

This invention relates to a support and transport system; and it relates in greater particularity to a support system for a platform and to a transport system movable relative thereto. By way of example, the invention is especially useful in photogrammetric viewing systems wherein photographic images are inspected either optically or electronically.

Considering photogrammetry as an exemplary environment for the invention, in one particular photogrammetric viewing system two photographic transparencies comprising a stereo pair are respectively scanned through appropriate lens systems by flying spot cathode ray tubes, and the resultant image-modulated light energy is collected by photo-transducers for electronic reproduction of the scanned images. Such photographic transparencies are supported during the scanning operation by a transport system which is adjustably movable over a flat platform or tabletop serving as a reference plane for the scanning system; and if the electronic reproduction of the photographic images is to have a high order of fidelity and be useful, the transparencies must be positionally oriented within very close tolerances relative to the reference platform so as to be accurately held at the plane of focus of the lens and scanning system. Therefore, the requirements for platform flatness and limitations on transport motion along the scanning axis (usually vertical) are quite restrictive.

In photogrammetric viewing systems of such type, it is usual to inspect the photographic images point-by-point; and its is necessary, therefore, that the transport be susceptible of refined positional adjustments so that each point of interest in the photographic transparencies can be accurately oriented with respect to the scanning beams and corresponding points in the two photographic images brought into proper register in order that a useful stereoscopic image of any point of interest be provided. Consequently, the transport system should be characterized by being freely and easily movable relative to the platform, and it should be able to maintain readily any position into which it is moved so that any selected point of interest in the photographic images remain properly aligned with the scanning beams.

Conveniently, a glass platform or tabletop is employed as the reference plane in such viewing system because the transparency of glass permits the scanning beams of the cathode ray tubes to pass therethrough. Consequently, it is unnecessary to form scanning openings in the platform as would be the case if it were formed of an opaque or translucent material. However, it is practicably necessary to restrict the thickness of the glass platform to approximately ¼ of an inch or less in order to avoid distortion in the scanning beams transmitted therethrough (thin glass plate also has the further advantages of lighter weight and lower cost than thicker glass plates); but a plate of glass of such thickness is not sufficiently rigid to avoid sagging or deflection in the vertical direction (i.e., along the scanning axis), and the resultant distortion which would be introduced into the viewing system because of the accompanying displacements of the photographic transparencies from the focal plane of the scanning system would be intolerable. Additionally, any random loads imposed upon such a thin glass platform would aggravate the deflection tendency thereof and further reduce the fidelity of the scanning and viewing systems.

In view of the foregoing, an object of the present invention is to provide a support system for a platform effective to uniformly support the same along substantially all incremental surface areas thereof so that any tendency of the platform to sag because of its lack of rigidity or random loads being imposed thereon is overcome.

Another object of the invention is that of providing a platform and support system therefor in which the platform acts as a weightless rigid member stably supported at three non-linearly oriented points.

Still another object is in the provision of a support system of the character described which permits the platform to be leveled and enables the precise disposition of the plane defined thereby (which, in the case of the aforementioned photogrammetric viewing system, is the reference plane located along the scanning axis in generally normal orientation therewith) to be selectively adjusted and thereafter automatically maintained irrespective of changes in the external load applied to the plate, whether distributed thereover or localized.

A further object of the invention is to provide a transport system in which the vertical stability thereof is maximized, which has minimum inertia and minimum frictional and stictional resistance to movement, and yet irrespective of its freedom of translational movement maintains itself readily in any position of adjustment.

Yet a further object is in the provision of a support and transport system adapted for use in a photogrammetric viewing system, and which includes a platform and support system therefor of the character described which platform defines a reference plane for such viewing system; and which further includes a transport system as heretofore set forth translationally movable with respect to the reference platform and operative in association therewith to maintain photographic articles carried by the transport system at the plane of focus of the viewing system.

Additional objects and advantages of the invention will become apparent as the specification develops.

An embodiment of the invention is illustrated in the accompanying drawings, in which.

The structural embodiment of the invention shown in

Figure 1:
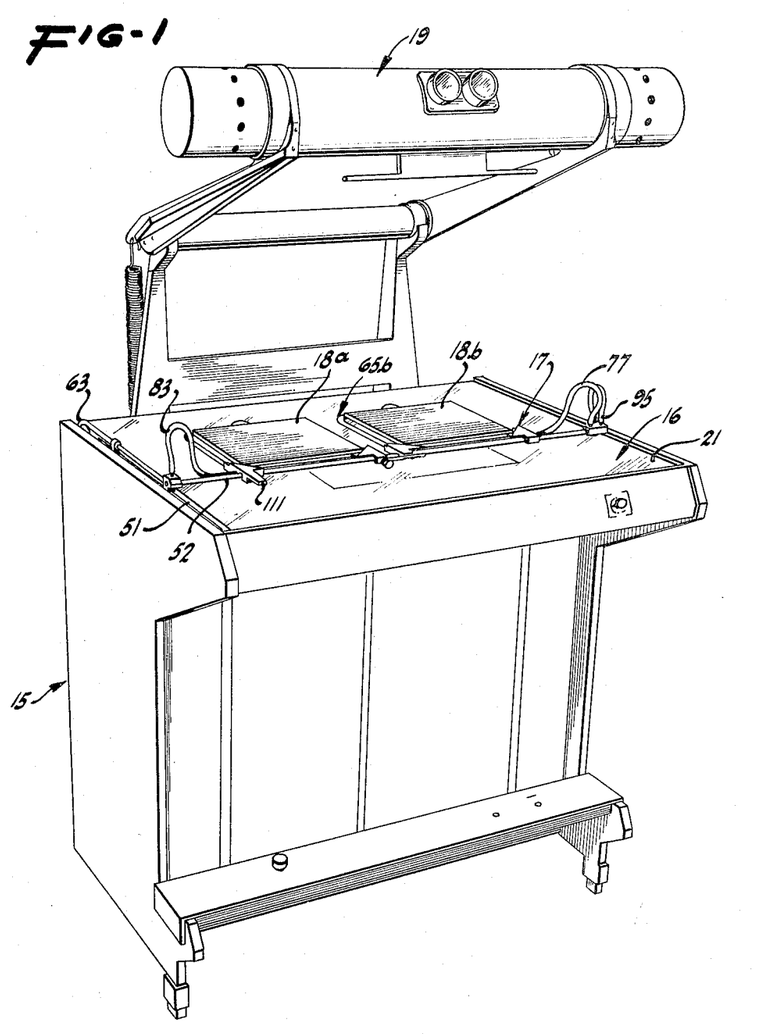
—
FIGURE 1 is a perspective view of a photographic inspection system embodying the invention.

FIGURE 1 is illustrated in association with a photogrammetric viewing system, certain components of which are omitted for clarity of detail since the operational characteristics of the system are not germane to the present invention. The viewing system in its entirety includes a console or cabinet 15 concealing within a compartment therein a pair of flying spot cathode ray tubes and associated circuitry and mechanism. The console includes a flat platform or tabletop and support system therefor, generally indicated at 16, and a transport system 17 movable over the platform so as to selectively position a pair of photographic transparencies 18a and 18b, forming a stereo pair, relative to the scanning beams of the cathode ray tubes. The image-modulated light energy of such scanning beams is collected by photo-transducers (not shown) such a photo-multiplier tubes for reproduction of a stereoscopic image at viewing station 19.

Figure 2:
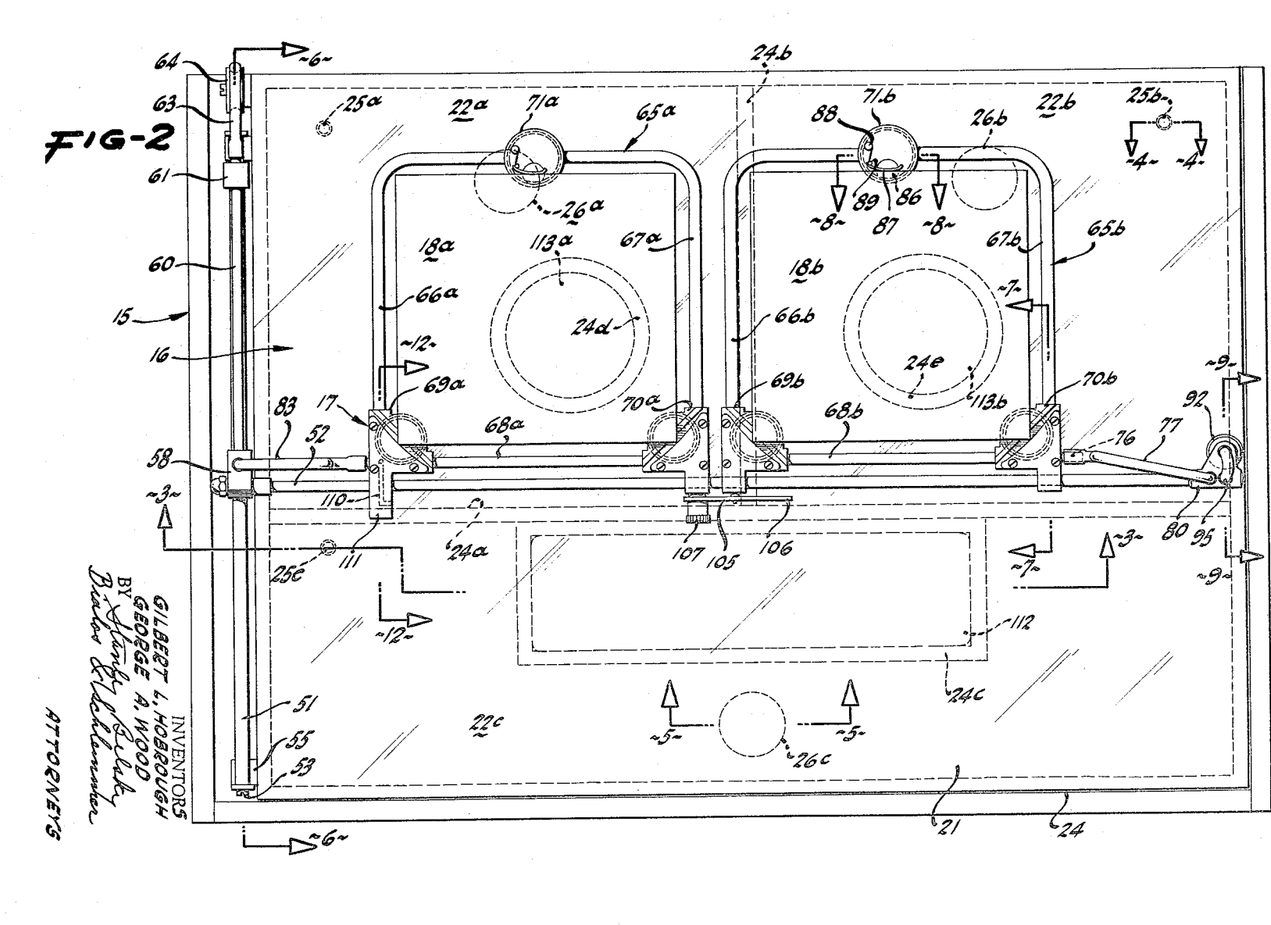
FIGURE 2 is an enlarged, top plan view of the platform or tabletop and the transport system.
Figures 3, 7, 8, 9, 10, 11, 12:
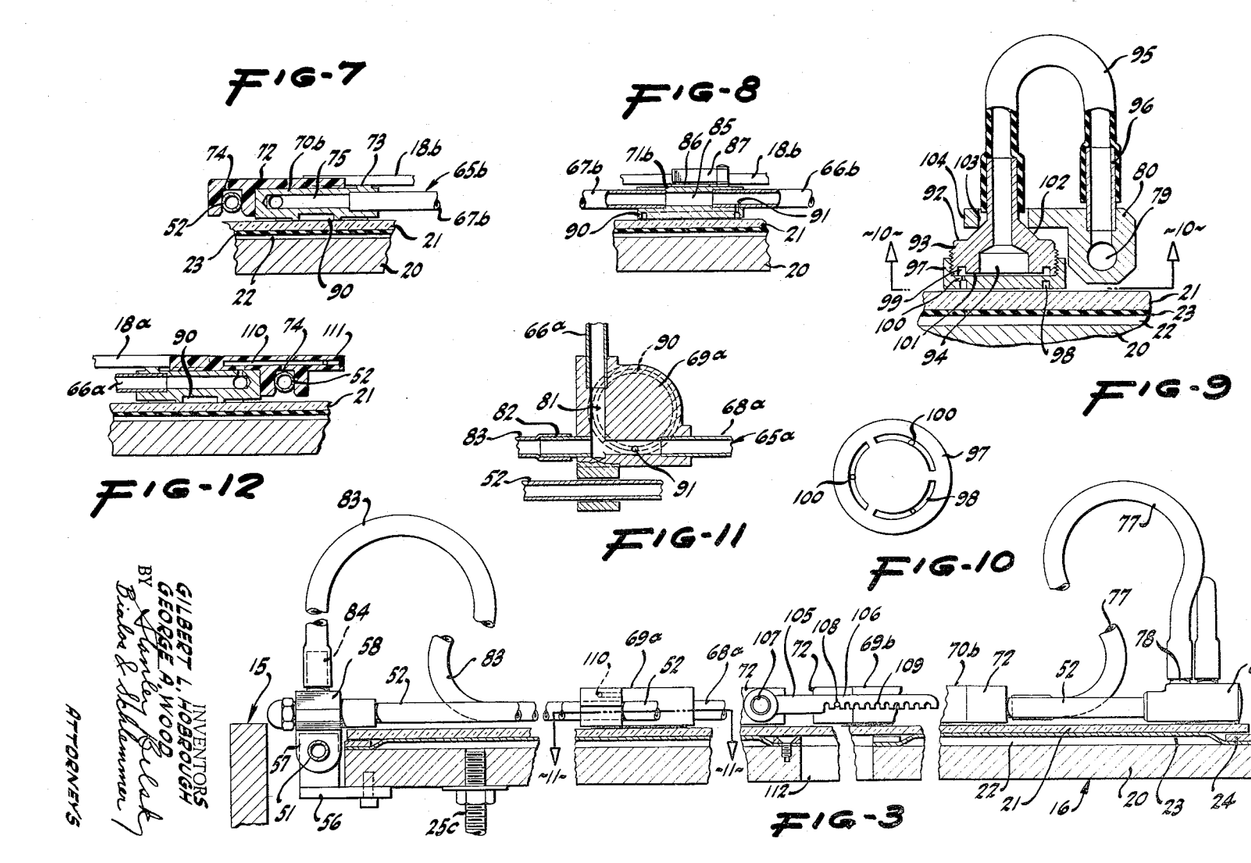
FIGURE 3 is a further enlarged, broken longitudinal sectional view taken along the line 3—3 of FIGURE 2.
FIGURE 7 is an enlarged, broken transverse sectional view taken along the line 7—7 of FIGURE 2.
FIGURE 8 is an enlarged, broken longitudinal sectional view taken along the line 8—8 of FIGURE 2.
FIGURE 9 is an enlarged, broken transverse sectional view taken along the line 9—9 of FIGURE 2.
FIGURE 10 is a bottom plan view taken along the plane 10—10 of FIGURE 9.
FIGURE 11 is a horizontal sectional view taken along the line 11—11 of FIGURE 3.
FIGURE 12 is a broken transverse sectional view taken along the line 12—12 of FIGURE 2.

Referring to FIGURES 2 and 3 in particular, the platform and support system 16 is seen to comprise a base 20 carried by the console 15 in generally horizontal disposition. The base may be formed from any relatively rigid material which is substantially fluid-impervious, and in the illustrated structure the base is wooden. Superjacent the base 20 in generally parallel disposition therewith is a flat, generally planar platform or tabletop 21 which in the present structure is transparent, and specifically is plate glass. Interposed between the base 20 and platform 21 is hermetic seal structure of a character that permits movement of the platform 21 in directions generally normal thereto and relative to the base 20. The platform 21 is spaced from the base 20, and the base and platform together with the seal structure define a pressurizable chamber 22. The illustrative seal structure comprises a flexible, resilient membrane 23 that may be formed of rubber, and such membrane is sealingly secured to the base 20 at appropriate locations therealong, to form such pressurizable chamber, by frame elements 24 which overlie the membrane and may be secured to the base by any suitable means, such as screws.

The platform 21 is a rectangular member (as shown best in FIGURE 2), and the frame elements 24 are perimetrically disposed and are substantially coextensive with the edge portions of the platform. Additionally, however, an intermediate frame element 24a extends longitudinally between the ends of the frame and divides the pressurizable chamber 22 into two separate chambers; and a frame element 24b extending between the frame element 24a and the rearmost frame element divides one of the two chambers into two equal sections. Thus, the pressurizable chamber 22 constitutes three fluid-isolated sections which, for identification, are generally denoted in FIGURE 2 with the numerals 22a, 22b and 22c.

Figures 4, 5, 6:
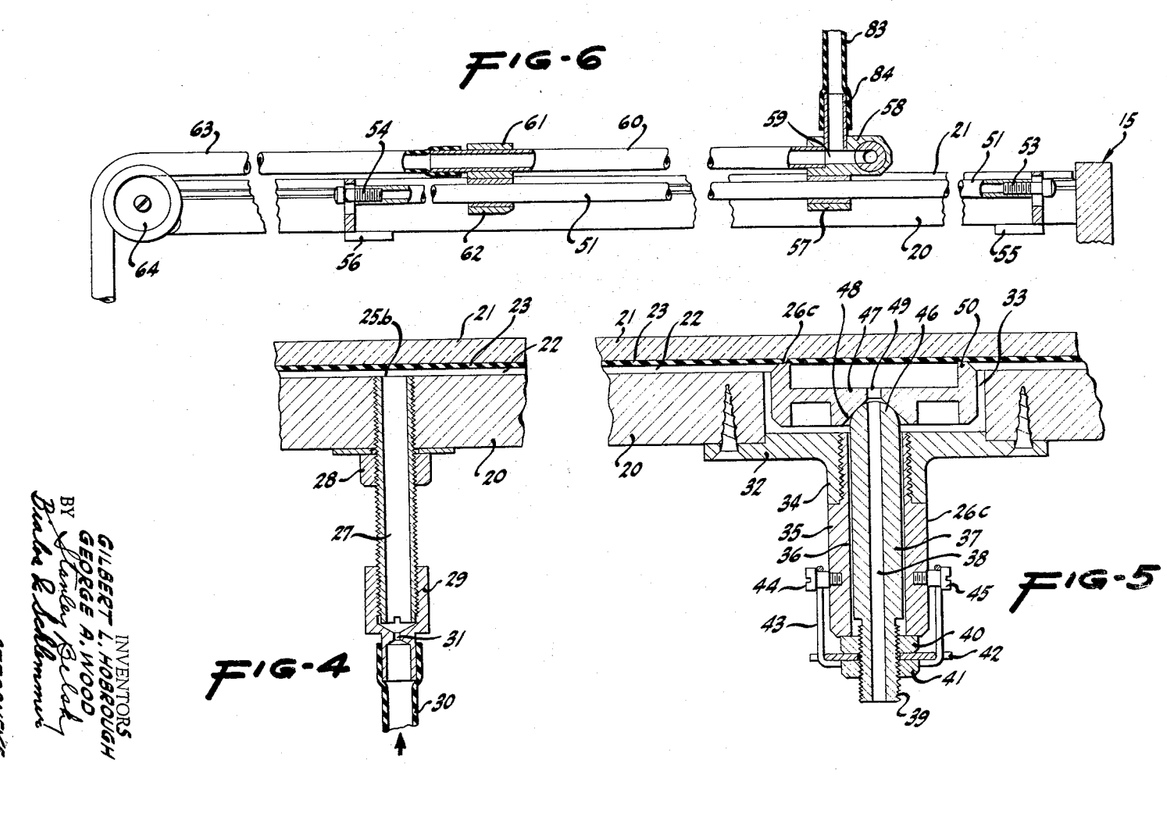
FIGURE 4 is a greatly enlarged, broken vertical sectional view of one of the air inlets for the support system taken, for example, along the line 4—4 of FIGURE 2.
FIGURE 5 is a greatly enlarged, broken vertical sectional view of one of the exhaust outlets of the support system taken along the line 5—5 of FIGURE 2.
FIGURE 6 is an enlarged, broken transverse sectional view taken along the line 6—6 of FIGURE 2.

Each of the pressurizable chamber sections is provided with both an inlet and an outlet; and in FIGURE 2, the inlets are respectively denoted with the numerals 25a, 25b and 25c and the outlets with the numerals 26a, 26b and 26c. All of the inlets are identical, and the details of the inlet 25b are shown in FIGURE 4. Referring thereto, the inlet is seen to comprise a pipe or conduit 27 threaded at its upper end so as to be threadedly received within an opening provided therefor in the base 20. The conduit is fixedly maintained in such position by a lock nut 28. Adjacent its lower end the conduit has threadedly secured thereto a coupling 29 adapted to be connected to a suitable source of pressurized fluid, usually a gaseous fluid such as compressed air, through a supply conduit 30. The coupling 29 is provided with a restricted metering opening 31 therein that reduces the rate of flow of fluid into the pressurizable chamber.

Each of the outlets 26 is identical, and details of the outlet 26c are shown in FIGURE 5. Referring thereto, the outlet is seen to comprise a fitting 32 secured to the base 20, as by means of the screws shown; and the fitting defines the lower end closure for a large opening 33 in the base 20. The fitting has an integral depending collar 34 providing a threaded bore therethrough centrally aligned with the opening 33 in the base, and threadedly received within such collar is an elongated sleeve 35 having a longitudinally extending passage 36 therein also centrally aligned with the opening 33. Slidingly mounted within the passage 36 in sealing engagement therewith is a valve stem 37 having a flow passage 38 extending therethrough, and the lower end portion 39 of the valve stem is threaded so as to receive a pair of nuts 40 and 41 thereon. Interposed between the nuts is a bracket 42 that forms a seat or point of connection for the lower end of a spring structure 43, the upper end portions of which are secured to the sleeve 35 by screws 44 and 45.

The spring structure 43 is a tension spring operative to bias the valve stem 37 upwardly, and in the particular form shown the spring structure is a length of rubber. The uppermost position of the stem 37 (for the contemporary adjustment thereof) is illustrated in FIGURE 5, and is defined by abutment of the nut 40 with the lower end of the sleeve 35. Evidently, the upper limit of displacement of the valve stem 37 within the sleeve 35 can be varied by moving the nuts 40 and 41 either upwardly or downwardly along the threaded lower end 39 of the valve stem 37; and if the nuts are moved upwardly therealong, the maximum upward displacement of the valve stem within the sleeve is decreased, and vice versa.

At its upper end, the valve stem 37 is rounded as shown at 46, and has a generally hemispherical curvature adapted to seat thereon a valve element 47 provided with a centrally disposed frusto-conical opening 48 that receives such upper end 46 therein, whereupon the valve element is capable of slight angular displacements relative to the valve stem 37 without destroying the essentially fluid-tight seal defined along the line contact between the upper end 46 of the stem and the frusto-conical opening 48. Such permissible angular displacements of the valve elements 47 permits the planes respectively defined by the upper surfaces of the annular lips 50 thereof to conform to the disposition of the planar platform 21.

The valve element 47 has a flow port 49 therethrough communicating with the flow passage 38 in the valve stem, and adapted to establish communication thereof with the pressurizable chamber 22 to permit the escape of fluid therefrom. The valve element 47 is annular, and has a substantially continuous upwardly extending lip 50 adapted to sealingly support the platform 21 thereon; and in the specific structure shown, sealing engagement between the annular lip 50 and platform 21 is provided by the resilient diaphragm 23 interposed therebetween.

In operation of the platform and support system 16, each of the inlets 25 is connected to a source of pressurized fluid which, in the usual case, will be a gaseous fluid such as compressed air; and such source may be an air compressor housed within the console 15. Consequently, the chamber 22 is pressurized, and more particularly each of the three sections 22a, 22b and 22c is pressurized by the fluid supplied thereto through the respectively associated inlets 25. The compressed air supplied to the chamber 22 is operative between the upper surface of the base 20 and lower surface of the platform 21 (in the latter instance through the diaphragm 23) to develop a pressure force of sufficient magnitude to elevate the platform 21 slightly from the frame elements 24, as shown in FIGURE 3, whereupon the platform is floatingly supported as a substantially weightless member. The value of the pressure developed within the chamber 22 to effect such floating support of the platform 21 depends upon the weight of the platform and the magnitude of any external loads applied thereto in a downward direction; and by way of specific example, in one installation the pressure is in the order of 0.02 p.s.i.g. and is supplied from a source delivering approximately 2.0 p.s.i.g.

Not only is it desired to support the platform 21 on a cushion of pressurized gas, but it is also desired to accurately establish and maintain the position of the platform so that the photographic transparencies 18 which are supported thereby (see FIGURE 1) are located at the plane of focus of the scanning system of the photogrammetric viewer; and therefore the platform 21 serves as the reference plane for such viewer, and in particular the scanning system thereof. Practically, this imposes the requirement that the platform 21 have a predetermined positional relation with respect to the base 20, and such positional relation is determined by regulating the relative rates of the supply of pressurized gas to and the escape of gas from the chamber 22. In the structure shown, control over the relative rates of supply and escape of gas is maintained by controlling the rate of escape through the valve structures respectively associated with the outlets 26.

More particularly, and referring to FIGURE 5, the platform 21 is shown in the uppermost position thereof in which it is spaced from the frame elements 24 (see FIGURE 3). In this position, the upper annular edge portion 50 of each valve element 47 is sealingly engaged by the membrane 23 and platform 21, and there is no escape of gas outwardly through the exhaust passage 38 in the valve stem. It may be noted that there is no material escape of gas between the outer surface of the valve stem 37 and circumjacent surface of the sleeve 35 because of the close fit provided therebetween, the length of these elements, and the relatively low pressures involved.

As the pressure within the chamber 22 begins to rise because of the continuous supply of gas thereto through the various inlets, the platform 21 begins to rise slightly relative to the base 20; and any such tendency toward further upward displacement of the platform 21 destroys the sealing engagement of the lip 50 of each valve element with the membrane 23 so that fluid flows over such lip, into the interior of the valve element, and outwardly therefrom through the port 49 and exhaust passage 38 in the valve stem. The pressure within the chamber 22 is accordingly decreased, and the platform 21 settles downwardly the small distance required to terminate such escape of gas. Thus, the platform 21 oscillates imperceptibly between the position shown in FIGURE 5 and a slightly higher position permitting the escape of gas over the valve element 47; and quite apparently, the extent of such oscillatory displacements of the platform is held very small by making the cross sectional area of the exhaust outlet defined by the passage 38, port 49 and surface area of the annular lip 50 many times greater than the cross sectional area of the inlet openings defined by the metering ports 31.

The exact elevation of the platform 21 may be selectively varied by changing the maximum permissible upward displacement of the valve stem 37 and valve element 47 carried thereby. That is to say, when the chamber 22 is pressurized, the platform 21 is displaced upwardly and the spring structure 43 is sufficiently strong to cause the valve stem 37 and valve element 47 to be displaced upwardly against the gravitational forces tending to hold the same downwardly (any differences between the values of the pressure forces acting downwardly upon the valve element and upwardly thereagainst being negligible).

The spring structure 43 causes the valve stem and valve element to move upwardly until the nut 40 abuts the lower edge of the sleeve 35; and once such abutment is established, further upward displacement of the valve element and valve stem is positively prevented. In that the platform 21 cannot move upwardly beyond the position shown in FIGURE 5 without permitting the escape of gas from the chamber 22, the maximum upward displacement of the valve structure is effective to define the operating position of the platform 21.

Clearly, such operating position of the platform can be raised by moving the nuts 40 and 41 downwardly along the threaded end 39 of the valve stem 37, which permits the valve structure to move upwardly to a greater extent; or lowered by moving the nuts 40 and 41 upwardly along the threaded end portion of the valve stem, which permits the valve structure to move upwardly a lesser distance. Not only can the operating position of the platform 21 be adjustably established in the foregoing manner, but the platform can be leveled by adjusting one or more of the valve structures to effect this result.

It is clear from the foregoing that the platform 21 is supported along substantially the entire undersurface thereof, and that substantially each incremental surface area is supported by an upwardly directed force of the same magnitude. Thus, any tendency of the platform to sag or deflect downwardly because it lacks sufficient rigidity to maintain a planar relationship is obviated. Although the platform is supported so that it has the effect of being a substantially weightless member, it is stably supported by the equivalent of a tripod support because of the three flow-isolated pressurizable chamber sections 22a, 22b and 22c and the independent inlet and outlet means respectively associated therewith. Controlling the relative rates of supply and escape of gas through each of the chamber sections enforces a predetermined positional relation on the platform 21 relative to the base 20, and such positional relation is continuously and automatically maintained.

It may be further noted that the support system accommodates automatically any change in external load applied to the platform; and for example, if such load is increased, the platform 21 tends to be displaced downwardly. The result of this is that the pressure within the chamber 22 builds up to a slightly greater value and returns the platform to its prior position. Corrective action in the reverse sense occurs if the external load applied to the platform is decreased. If the application of any such external load is localized which, for example, might tend to tilt the platform 21 downwardly in the area of the applied load and elevate the same at an opposite location, corrective action of the two exhaust outlets would occur concurrently in the reverse sense and return the platform to its prior position. Therefore, the platform 21 tends to have a substantially force-invariable positional stability. When the supply of gas to the chamber 22 is terminated and the chamber consequently exhausted, the weight of the platform moves the same downwardly until it seats against the frame elements 24. This downward movement of the platform causes the valve elements 47 and associated valve stems 37 to be pushed downwardly against the upward biasing force of the springs 43.

The transport system 17, referring to FIGURES 2 and 6 in particular, includes a track 51 and a rail 52 that form a pair of axes defining the paths of movement of the transport. In the particular embodiment shown, the track and rail are disposed at substantially right angles with respect to each other, and therefore such axes are rectangular coordinate axes in which the rail 52 establishes the $x$ or longitudinal direction and the track 51 the $y$ or transverse direction. The track 51 is rigidly related to the base 20, and comprises a tube or rod secured at the opposite ends thereof by cap screws 53 and 54 to brackets 55 and 56 fixedly attached to the base 20. The cap screws 53 and 54 respectively extend through openings provided therefor in the brackets, and such openings are vertically elongated to permit adjustment of the track 51 in such direction.

The rail 52 is slidably carried adjacent one end thereof by the track 51 with the result that the rail is movable along the track. The interconnection of the rail and track is established through an anti-friction sleeve or bearing 57, which is slidably circumjacent the track 51 and is rigidly secured to a fitting 58 that threadedly receives the end portion of the rail 52 therein. The rail 52 (see FIGURE 3) is a hollow tube defining a flow passage therethrough, and such flow passage is in open communication with a flow passage 59 formed in the fitting 58. Also secured to the fitting 58 is a rigid flow conduit 60, the hollow interior of which is in open communication with the passage 59 in the fitting. Adjacent one end thereof, the rigid conduit 60 is equipped with a collar 61 fixedly secured thereto, and depending from the collar is an anti-friction device or bearing 62 slidably circumjacent the track 51. Thus, the rigid flow conduit 60 together with the bearings 57 and 62, which are fixedly secured thereto through the collar 61 and fitting 58 and slidably engage the rail 51, define a guidance system for the rail 52 enforcing movement thereon having a predetermined angular orientation with respect to the track 51, and which in the particular structure is substantially normal thereto.

Connected to the rigid flow conduit 60 is a flexible tube or flow conduit 63 arranged so as to permit movement of the rigid conduit 60 and components associated therewith along the track 51. As shown in FIGURE 6, the flexible tube 63 may be entrained over a rotatable guide wheel or sheave 64, and is adapted to be connected to a supply of pressurized gaseous fluid such as the aforementioned compressor housed within the console 15.

Slidably mounted upon the rail 52 are a pair of generally square-shaped frames 65a and 65b respectively supporting the photographic transparencies 18a and 18b thereon. Each of the frames is formed in three individual legs, two of which are generally L-shaped and the other of which is straight. For identification, such legs are denoted with the numerals 66a, 67a and 68a with respect to the frame 65a, and with the numerals 66b, 67b and 68b with respect to the frame 65b.

Each of the frames is a hollow tubular conduit defining a flow passage therethrough; and at one end the frame element 66a is connected to a fitting 69a, and the element 67a is similarly connected to a fitting 70a. The frame element 68a is connected at opposite ends to the fittings 69a and 70a, and the frame elements 66a and 67a at their adjacent end portions are connected to a common fitting 71a.

The fittings 69 and 70 are generally similar, and the fitting 69a is shown in detail in FIGURE 11, and the fitting 70b in FIGURE 7. The fitting 71b is shown in FIGURE 8. As shown best in FIGURES 2 and 7, each of the fittings 69 and 70 has attached by cap screws or other suitable means to the upper surface thereof a bearing plate 72 that forms along the inner edge thereof an abutment for the associated photographic transparency, and each fitting has a slightly raised seat or projection 73 therealong inwardly of the bearing plate 72 to form a pad of restricted area for receipt of the photographic transparency thereon, whereby each transparency effectively has a three-point support which will be more evident hereinafter.

The bearing plate 72 has an inverted, generally U-shaped opening 74 defining an open channel spaced outwardly from the associated fitting, and such channel or opening seats upon the rail 52 and forms a slidable bearing thereon. The fact that each such channel 74 is open along the bottom thereof permits the frames 65a and 65b to be lifted from the rail 52. The fitting 70b is provided with a generally L-shaped flow passage 75 therethrough that at one end connects to the element 67b of the frame 65b, and which at its other end connects with the element 68b of the frame. The point of mergence of the two branches of the L-shaped passage 75 is connected through a coupling 76 with one end of a flexible conduit 77 which, at its opposite end, connects through a coupling 78 with a passage 79 (see FIGURE 9) in a fitting 80 rigidly secured to the rail 52 such that the flow passage through the rail opens into the passage 79 in the fitting. Therefore, a pressurized gaseous fluid is fed to the frame 65b through the flexible supply conduit 63, rigid tube 60, fitting 58, rail 52, fitting 80, flexible conduit 77 and fitting 70b. The frame element 67b carries the compressed gas to the fitting 71b, and the element 68b carries the gas to the fitting 79b. The fitting 69b in being essentially the same as the fitting 70b has an L-shaped passage therethrough communicating with both of the frame elements 68b and 66b. Therefore, the gaseous fluid can flow through the frame element 66b either toward or away from the fitting 69b depending upon which end of the frame element is at a superior pressure.

The fitting 69a is also similar to the fitting 70b and (as shown in FIGURE 11) has a generally L-shaped passage 81 therethrough, one end of which communicates with the frame element 66a and the other end with the frame element 68a. The passage 81 is connected through a coupling 82 to one end of a flexible conduit 83, which at its other end connects through a coupling 84 to the fitting 58 and to the flow passage 69 therein (FIGURE 6). Consequently, the frame 65a is supplied with compressed gaseous fluid through the flexible conduit 63, rigid conduit 60, fitting 58, flexible conduit 83 and fitting 69a. The fitting 70a is similar to the fitting 70b and fittings 69, and therefore has an L-shaped passage therethrough connecting at one end to the frame element 67a and at its other end to the frame element 68a.

The fittings 71a and 71b (see FIGURE 8) are identical, and each has a substantially linear flow passage 85 extending therethrough which, in the case of the fitting 71b, connects at one end to the frame element 66b and at its other end to the frame element 67b. Each of these fittings is provided with a slightly raised seat or projection 86 of restricted area adapted to seat the associated photographic transparency thereon. A leaf spring 87 is secured to each of the fittings 71 along the upper surface thereof, and resiliently engages an edge portion of the associated transparency 18 to urge the same against the raised surfaces of the bearing plates 72 to confine the transparencies in the positions shown in FIGURES 1 and 2. Each of the springs 87 is secured at one end to a post 88 and is bent about a fulcrum pin 89.

Each of the fittings 69, 70 and 71 defines a support pad in juxtaposition with the upper surface of the platform 21, as shown most clearly in FIGURES 7 and 8. The undersurface of each of the support pads is substantially planar, and is provided therealong with fluid discharge means in the form of an annular channel 90 (the same numeral is used to identify the channels in the pads or fittings 69a, 70b and 71b respectively illustrated in FIGURES 11, 7 and 8, because the channel in each instance is of substantially the same size and configuration and serves the same function). The channel 90 is in flow communication with the passage through the associated fitting as by means of a small port 91; and such fitting passages, then, define supply spaces serving the annular channels in flow communication therewith.

A further support pad is provided which is carried by the rails 52, and the details of such pad are illustrated in FIGURES 9 and 10. The pad is denoted in general with the numeral 92, and comprises a fitting 93 having a chamber 94 therein defining a supply space connected by a flexible conduit 95 and coupling 96 to the passage 79 in the fitting 80. The fitting 93 is externally threaded and receives a cap 97 thereon having a generally planar undersurface adapted to be disposed in juxtaposition with the platform 21. Such undersurface is provided with fluid discharge means in the form of an annular channel 98 that communicates with a manifold chamber 99 through a plurality of restricted flow ports 100. The manifold chamber 99 connects with the supply space 94 through quite restricted passage means 101 formed between the facing surfaces of the fitting 93 and cap 97. Such restricted passage means 101 establishes a filter that prevents foreign materials which might be entrained in the gaseous fluid from entering the manifold chamber 99 and clogging the small ports 100 which, in a particular structural embodiment of the invention, are approximately $\frac{1}{64}$ of an inch in diameter. The ports 91 are ordinarily substantially larger than the ports 100, and require no protective filter arrangement to prevent clogging thereof.

Referring to FIGURE 10, it is noted that the annular channel 98 of the support pad 92 is discontinuous, and in particular comprises three angular segments spaced from each other, each of which communicates with the manifold chamber 99 through a restricted port 100. In contrast thereto, the annular channels 90 in the support pads formed by the fittings 69, 70 and 71 are continuous or endless and are adequately supplied with compressed gas through a single port 91.

The fitting 93 has a generally frusto-conical surface 102 adjacent the upper end thereof which extends into an annular opening 103 formed in an extension 104 of the fitting 80, and the line contact established between the lower edge of the opening 103 and abutting surface of the cone-shaped portion 102 of the fitting 93 permits slight articulation of the fitting so that the disposition of the undersurface of the support pad can conform to the orientation of the platform 21.

It should be noted that the total area defined by the channels 90 and 98 along the undersurfaces of the associated pads is materially less than the total area of such surfaces, and particularly of the surface areas thereof disposed interiorly or inwardly of the channels. This relationship has been found to be quite important in that it obviates any tendency of the support pads to chatter or vibrate as a consequence of a hunting action resulting from cyclically repetitive increases and decreases in the magnitude of the pressure force defined between the upwardly facing surface of the platform 21 and downwardly facing surfaces of the support pads. That is to say, in the absence of such relationship, the pressure force developed between the platform and support pads tends to cause the latter to rise, and the sudden escape of the pressure fluid through the large opening resulting from such upward displacement reduces the pressure force to a value permitting the support pads to physically engage the platform. The pressure force again builds up, causing the support pads to rise; and the cycle is then repeated.

With the provision of the large surface area inwardly of the channel, the volume defined between such surface and the platform 21 is quite small and is effectively confined by the gaseous fluid escaping through the channel. Therefore, any tendency toward downward displacements of the support pads is positively resisted by the viscosity of the air spring formed by said volume, and the pad can descend only to the extend that the gaseous fluid in such volume is compressed and at the rate at which the gaseous fluid can escape from such volume. Thus, the function is somewhat akin to that of a dashpot, and the damping action thereby provided is effective to stabilize the support pads and prevent chattering thereof.

As described heretofore, the two frames 65a and 65b are independently movable relative to the rail 52, but ordinarily it is desired to move the same along the x and y axes simultaneously once the relative spacing between the frames has been established in accordance with the requirements of any pair of stereo transparencies 18a and 18b supported thereon. Accordingly, fastener structure 105 is provided (see FIGURES 2 and 3) to selectively and adjustably secure the frames to each other. In the form shown, such fastener structure includes an arm 106 pivotally supported by a pin 107 on the plate 72 of the fitting 70a, and a locking pin 108 adapted to seat within a plurality of recesses 109 formed along the lower edge of the arm 106. Thus, the frames can be released from each other by elevating the arm 106 to separate the recesses 109 from the latch pin 108, and the frames can be connected together in various positions of adjustment by selecting the appropriate recess 109 for receipt of the latch pin 108 therein.

The supply of compressed gaseous fluid to the various fittings and support pads defined thereby (namely, the fittings 69, 70 and 71, and 92) is under the control of valve structure which may take any convenient form, and in the particular embodiment illustrated comprises a generally L-shaped flow passage 110 (shown best in FIGURE 12) formed in part through the support plate 72 of the fitting 69a, and in part within a handle or hand-hold 111 integrally or otherwise carried by such pad. At one end the passage 110 is in open communication with the L-shaped passage 81 in the fitting 69a, and at its other end opens to atmosphere. The control passage 110 is sufficiently large that the escape of gas therefrom reduces the flow rate to the support pads to an amount ineffective to cause elevation thereof above the platform 21. However, when the control passage 110 is closed, as by placing the thumb of a hand thereover, the loss of gas is prevented and the pads are then caused to rise above the surface of the platform. The location of the outlet of the control passage 110 at the hand-grip 111 is a convenience in that it places such control over the gaseous fluid, and control for the adjustable displacements of the transport at the same position.

In operation of the transport system, the supply conduit 63 is connected to a source of compressed gaseous fluid as heretofore described, and the compressed gas is delivered to the frame 65a and associated pads 69a, 70a and 71a through the flexible conduit 83, and to the frame 65b and associated pads 69b, 70b and 71b through the rail 52 and flexible conduit 77, and to the pad 92 through the flexible conduit 95. When the control passage 110 is closed, the gaseous fluid escaping through the channels 90 of the pads 69, 70 and 71 and through the channel 98 of the pad 92 causes all such pads to be elevated slightly above the upper surface of the platform 21. As a result, the entire frame and track composition is supported on air except for the mechanical attachment of the rail 52 to the track 51 through the bearing 57 (and the bearing 62—both of which could be air bearings). Therefore, the frames 65a and 65b and the photographic transparencies carried thereby are effortlessly displaced in both the x and y directions, and are guided for movement in the x direction by the bearing structures slidably connecting the same to the rail 52, and are guided in the y direction by the bearings 57 and 62 slidably connecting the rail 52 to the track 51.

By such an arrangement, then, inertia as well as frictional and stictional resistance to movement are minimized, and the transport can be accurately displaced into any selected position of adjustment. Yet the transport is able to maintain itself in any position of adjustment, and effects this result simply upon opening of the control passage 110 which causes the frames 65a and 65b to move downwardly, whereupon the undersurfaces of the support pads engage the platform 21. The relatively large surface areas of all of the pads, then, offer a high degree of frictional resistance to movement.

As shown in FIGURES 1 and 3, the base 20 is provided with an elongated opening 112 therein which is adapted to have a light disposed thereunder, and this enables an operator to initially inspect the photographic transparencies 18a and 18b optically, and to adjust the spacing between the frames 65a and 65b so as to generally correlate the images thereof for stereoscopic reproduction. Quite evidently, the opening 112 must be sealingly related to the membrane 23 to prevent the escape of fluid therethrough, which is accomplished by frame elements 24c that secure the membrane to the base 20 in perimetric relation about the opening 112. Similarly, the base 20 is provided with openings 113a and 113b through which the scanning beams of the cathode ray tubes (not shown) are directed upwardly for transmission through the platform 21 and photographic transparencies 18a and 18b. The membrane 23 must be sealingly related to the base 20 about the openings 113, and this is accomplished by annular frame elements 24d and 24e.

From the description set forth, it is evident that the photographic transparencies 18a and 18b are accurately located at the plane of focus of the scanning system by the platform and support system 16 and the transport system 17; and such location of the transparencies is maintained both when the transport system is at rest and during translational displacements thereof because all of the support pads are elevated only very slightly above the platform 21 during displacements, and therefore the positions of the transport system both at rest and during movement thereof is practicably identical. In addition, the plane defined by the transparencies 18a and 18b can be made substantially coincident with the plane of focus of the scanning system, which is essentially normal to the scanning beams, in that the platform 21 can be leveled or adjusted through appropriate manipulation of the elevations of the exhaust outlets 26 to establish this relationship.

The track 51 and rail 52 define rotation-constraining guidance structure preventing the frames 65a and 65b (and more particularly the stereo transparencies respectively carried thereby) from exhibiting angular or rotational movements during translational displacements thereof, and apart from this specific function permit substantially uninhibited translational displacements in the sense that the frames can be moved into any desired position because of the permitted displacements thereof along the two axes respectively defined by the track and rail. Each of the frames has a tip-tilt stability enforced thereon because of the three support pads associated therewith which provide relatively independent corrective actions resulting in such stability. In this same manner, the support pad 92 because of its construction inherently has tip-tilt stability. More particularly, the individual or flow-isolated channels 98 provide relatively independent corrective actions resulting in such stability. Usually, the greater the number of channels (each necessarily being reduced in its angular dimension), the greater the tip-tilt stability because any localized force tending to tilt the pad affects only those channels in the immediate vicinity of such force, and their counterparts 180° therefrom, with the result that the corrective response is confined to the immediate areas involved and is not spread unnecessarily over a greater area as in the case of channels having greater angular dimensions.

While in the foregoing specification an embodiment of the invention has been set forth in considerable detail for purposes of making an adequate disclosure thereof, it will be apparent to those skilled in the art that numerous changes may be made in such details without departing from the spirit and principles of the invention.

We claim:

1. A support and transport system adapted for use in a photogrammetric viewing system, comprising a base, a relatively planar platform superjacent at least a portion of said base and being movable relative thereto in directions generally normal to the plane of said platform, seal structure intermediate said base and platform and defining therewith a pressurizable chamber, inlet means communicating with said chamber for supplying a pressurized fluid thereto, outlet means communicating with said chamber for permitting the escape of such pressurized gaseous fluid therefrom, means for regulating the relative rates to such supply and escape of fluid to maintain said platform in a predetermined positional relation with respect to said base to provide an accurately located reference plane for such viewing system, a frame adapted to receive an article thereon, at least three support pads carried by said frame in non-linearly oriented relation therealong and each having a plane-defining undersurface in juxtaposition with said platform, each of said pads being provided with a supply space and in flow communication therewith gaseous fluid discharge means disposed along such undersurface, conduit means connected with each of said supply spaces and being adapted to deliver compressed gaseous fluid thereto, and valve means for controlling the flow of such gaseous fluid to said supply spaces, the escape of such gaseous fluid through said discharge means being effective in one condition of said valve means to elevate said pads above said platform and thereby afford relatively free movement of said frame with respect thereto.

2. A support and transport system adapted for use in a photogrammetric viewing system, comprising a base, a relatively planar platform superjacent at least a portion of said base and being movable relative thereto in directions generally normal to the plane of said platform, seal structure intermediate said base and platform and defining therewith a pressurizable chamber, inlet means communicating with said chamber for supply a pressurized fluid thereto, outlet means communicating with said chamber for permitting the escape of such pressurized fluid therefrom, means for regulating the relative rates of such supply and escape of fluid to maintain said platform in a predetermined positional relation with respect to said base to provide an accurately located reference plane for such viewing system, rotation-constraining structure, a frame adapted to receive an article thereon and being connected with said structure so that rotational movements of said frame are constrained thereby, at least one support pad carried by said frame and having a plane-defining undersurface in juxtaposition wtih said platform, said pad being provided with a supply space and in flow communication therewith gaseous fluid discharge means disposed along such undersurface, conduit means connected with said supply space and being adapted to deliver compressed gaseous fluid thereto, and valve means for controlling the flow of such fluid to said supply space, the escape of such gaseous fluid through said discharge means being effective in one condition of said valve means to elevate said pad above said platform and thereby afford relatively free movement of said frame with respect thereto.

3. A support and transport system adapted for use in a photogrammetric viewing system, comprising a base, a relatively planar platform superjacent at least a portion of said base and being movable relative thereto in directions generally normal to the plane of said platform, hermetic seal structure intermediate said base and platform and defining therewith a pressurizable chamber, inlet means communicating with said chamber for supplying pressurized gaseous fluid thereto, outlet means communicating with said chamber for permitting the escape of such pressurized gaseous fluid therefrom, means including valve structure responsive to the position of said platform for regulating the relative rates of said supply and escape of fluid to maintain said platform in a predetermined positional relation with respect to said base to provide an accurately located reference plane for such viewing system, rotation-constraining structure and including a fixedly located track and a rail guidingly supported adjacent one end portion thereof by said track for longitudinal movements therealong, a frame adapted to receive thereon a photographic transparency or the like and being connected with said rail for longitudinal movements therealong, a plurality of support pads one of which is carried by said rail adjacent the other end thereof and the remainder of which are carried by said frame and each having a plane-defining undersurface in juxtaposition with said platform, each of said support pads being provided with a supply space and in flow communication therewith gaseous fluid discharge means disposed along such undesurface, conduit means connected with each of said supply spaces and being adapted to deliver compressed gaseous fluid thereto, and valve mean for controlling the flow of such gaseous fluid to said supply spaces, the escape of such gaseous fluid through said discharge means being effective in one condition of said valve means to elevate said pads above said platform and thereby afford relatively free movement of said frame and rail with respect thereto.

4. A support and transport system adapted for use in a photogrammetric viewing system, comprising a base, a relatively planar platform superjacent at least a portion of said base and being movable relative thereto in directions generally normal to the plane of said platform, hermetic seal structure intermediate said base and platform and being oriented and disposed to define therewith a plurality of pressurizable chambers, a plurality of inlet means respectively communicating with said chambers for supplying a pressurized gaseous fluid thereto, a plurality of outlet means respectively communicating with said chamber for permitting the escape of such pressurized fluid therefrom, a plurality of means respectively associated with said chambers and each including valve structure responsive to the position of said platform for regulating the relative rates of such supply and escape of fluid to maintain said platform in a predetermined positional relation with respect to said base to provide an accurately located reference plane for such viewing system, rotation-constraining guidance structure defining a pair of axes and including a fixedly located track forming one such axis and a rail forming the other such axis and being guidingly supported adjacent one end portion thereof by said track for longitudinal movements therealong, a frame adapted to receive thereon a photographic transparency or the like and being connected with said rail for longitudinal movements therealong, a plurality of support pads one of which is carried by said rail adjacent the other end thereof and the remainder of which are carried by said frame and each having a plane-defining undersurface in juxtaposition with said platform, each of said support pads being provided with a supply space and having along such undersurface thereof a relatively narrow annular channel in flow communication with the associated supply space and providing an escape for pressurized gaseous fluid therefrom, the surface area of each of said channels through which said fluid escapes being materially less than the area interiorly thereof along the undersurface of the associated pad, conduit means connected with each of said supply spaces and being adapted to deliver compressed gaseous fluid thereto, and valve means for controlling the flow of such gaseous fluid to said supply spaces, the escape of such gaseous fluid through said channels being effective is one condition of said valve means to elevate said pads above said platform and thereby afford relatively free movement of said frame and rail with respect thereto.

5. The system of claim 4 in which said valve structures are respectively connected with the associated outlet means for controlling the escape of fluid from said chambers, and in which each of said valve structures is adjustably positionable along the aforesaid directions of movement of said platform to selectively determine the positional relation of said platform with respect to said base.

6. The system of claim 5 in which said pluarlity of chambers comprises three in number whereby a tripod support is effectively provided for said platform, and in which said seal structure comprises a resilient stretchable membrance extending between said base and platform and being secured to said base at predetermined locations to define each of said chambers.

7. The system of claim 4 in which the aforesaid channels are endless in each of said support pads carried by said frame, and in which the channel provided in the support pad carried by said rail comprises a plurality of discontinuous angular segments.

8. The system of claim 4 in which a second frame and support pad composition is provided, the frame of which is connected with said rail for movements along the length thereof, and in which releasable and adjustable fastener structure is provided having cooperative elements respectively carried by each of said frames to secure the same to each other for simultaneous displacements thereof along said axes.

9. A support system, comprising a base, a platform superjacent at least a portion of said base and being movable relative thereto in directions generally normal to the plane of said platform, seal structure intermediate said base and platform and defining therewith a pressurizable chamber, inlet means communicating with said chamber for supplying a pressurized fluid thereto, outlet means communicating with said chamber for permitting the escape of such pressurized fluid therefrom, and means for regulating the relative rates of such supply and escape of fluid to maintain said platform in a predetermined positional relation with respect to said base.

10. The support system of claim 9 in which said means for regulating the relative rates of such supply and escape of fluid includes valve structure regulatively controlling the flow of fluid therethrough in response to any contemporary position of said platform.

11. The support system of claim 9 in which said means for regulating the relative rates of such supply and escape of fluid comprises valve structure connected with said outlet means for controlling the escape of fluid from said chamber.

12. A support system, comprising a base, a platform superjacent at least a portion of said base and being movable relative thereto in directions generally normal to the plane of said platform, seal structure intermediate said base and platform and being oriented and disposed to define therewith a plurality of pressurizable chambers, a plurality of inlet means respectively communicating with said chambers for supplying a pressurized fluid thereto, a plurality of outlet means respectively communicating with said chambers for permitting the escape of such pressurized fluid therefrom, and a plurality of means respectively associated with said chambers for regulating the relative rates of such supply and escape of fluid to maintain said platform in a predetermined positional relation with respect to said base.

13. The support system of claim 12 in which said plurality of chambers comprises three in number whereby a tripod support is effectively provided for said platform.

14. A support system for a platform defining a reference plane in a photogrammetric viewing system, comprising a base, a generally planar transport platform superjacent at least a portion of said base and being movable relative thereto in directions generally normal to the plane of said platform, hermetic seal structure intermediate said base and platform and defining therewith a pressurizable chamber, inlet means communicating with said chamber for supplying a pressurized gaseous fluid thereto, outlet means communicating with said chamber for permitting the escape of such pressurized gaseous fluid therefrom, and means including valve structure responsive to the position of said platform for regulating the relative rates of such supply and escape of fluid to maintain said platform in a predetermined positional relation with respect to said base to provide an accurately located reference plane.

15. The support system of claim 14 in which said seal structure is oriented and disposed to define with said base and platform a plurality of pressurizable chambers, in which a plurality of the aforesaid inlet means, outlet means and regulating means are provided in respective association with said chambers, and in which said valve structures are respectively connected with the associated outlet means for controlling the escape of fluid from said chambers.

16. The support system of claim 15 in which each of said valve structures is adjustably positionable along the aforesaid directions of movement of said platform to selectively determine the positional relation of said platform with respect to said base and the resultant reference plane of such viewing system.

17. The support system of claim 16 in which each of said valve structures comprises a stem and a valve element pivotally supported thereby, each of said valve elements having a perimetric edge portion adapted to sealingly receive said support platform thereon, the pivotal support of each of said valve elements enabling the same to conform to the orientation of said platform.

18. The support system of claim 17 in which said seal structure comprises a resilient stretchable membrane extending between said base and platform and being secured to said base at predetermined locations to define the aforesaid plurality of chambers.

19. A transport system for movement over a relatively planar platform, comprising a frame adapted to receive an article thereon, at least three support pads carried by said frame in non-linearly oriented relation therealong and each having a plane-defining undersurface for juxtaposition with such platform, each of said pads being provided with a supply space and in flow communication therewith gaseous fluid discharge means disposed along such undersurface, conduit means connected with each of said supply spaces and being adapted to deliver compressed gaseous fluid thereto, and valve means for controlling the flow of such fluid to said supply spaces, the escape of such gaseous fluid through said discharge means being effective in one condition of said valve means to elevate said pads above such platform and thereby afford relatively free movement of said transport system with respect thereto.

20. A transport system for movement over a relatively planar platform, comprising a frame adapted to receive an article thereon, at least three support pads carried by said frame in non-linearly oriented relation therealong and each having a plane-defining undersurface for juxtaposition with such platform, each of said pads being provided with a supply space and having along such undersurface thereof a relatively narrow annular channel in flow communication with said supply space and providing an escape for pressurized gaseous fluid therefrom, the surface area of said channel through which such fluid escapes being materially less than the area of the undersurface of said pad interiorly of said channel, conduit means connected with each of said supply spaces and being adapted to deliver compressed gaseous fluid thereto, and valve means for controlling the flow of such fluid to said supply spaces, the escape of such gaseous fluid through said discharge means being effective in one condition of said valve means to elevate said pads above such platform and thereby afford relatively free movement of said transport system with respect thereto.

21. The transport system of claim 20 in which said channel is endless.

22. In combination with a relatively planar platform, a transport system for movement thereover, comprising rotation-constraining structure, a frame adapted to receive an article thereon and being connected with said structure so that rotational movements of said frame are constrained thereby, at least one support pad carried by said frame and having a plane-defining undersurface in juxtaposition with said platform, said pad being provided with a supply space and in flow communication therewith gaseous fluid discharge means disposed along such undersurface, conduit means connected with said supply space and being adapted to deliver compressed gaseous fluid thereto, and valve means for controlling the flow of such fluid to said supply space, the escape of such gaseous fluid through said discharge means being effective in one condition of said valve means to elevate sad pad above said platform and thereby afford relatively free movement of said transport system with respect thereto.

23. In combination with a relatively planar platform, a transport system for movement thereover, comprising rotation-constraining structure, a frame adapted to receive an article thereon and being connected with said structure so that rotational movements of said frame are constrained thereby, a plurality of support pads carried by said frame and each having a plane-defining undersurface in juxtaposition with said platform, each of said pads being provided with a supply space and having along such undersurface thereof a relatively narrow annular channel in flow communication with said supply space and providing an escape for pressurized gaseous fluid therefrom, the surface area of each of said channels through which such fluid escapes being materially less than the area of the undersurface of the associated pad interiorly of the channel, conduit means connected with each of said supply spaces and being adapted to deliver compressed gaseous fluid thereto, and valve means for controlling the flow of such fluid to said supply spaces, the escape of such gaseous fluid through said channels being effective in one condition of said valve means to elevate said pads above said platform and thereby afford relatively free movement of said transport system with respect thereto.

24. In combination with a relatively planar platform, a transport system for movement thereover, comprising rotation-constraining guidance structure including a fixedly located track and a rail supported adjacent one end portion thereof by said track for longitudinal movements therealong, a frame adapted to receive an article thereon and being connected with said rail for longitudinal movements therealong, a plurality of support pads carried by said frame and each having a plane-defining undersurface in juxtaposition with said platform, each of said pads being provided with a supply space and in flow communication therewith gaseous fluid discharge means disposed along such undersurface, conduit means connected with each of said supply spaces and being adapted to deliver compressed gaseous fluid thereto, and valve means for controlling the flow of such fluid to said supply spaces, the escape of such gaseous fluid through said discharge means being effective in one condition of said valve means to elevate said pads above said platform and thereby afford relatively free movement of said transport system with respect thereto.

25. The combination of claim 24 in which said rail is equipped adjacent the other end portion thereof with a support pad having a plane-defining undersurface in juxtaposition with said platform, said last mentioned support pad being provided with a supply space and in flow communication therewith gaseous fluid discharge means disposed along such undersurface, and conduit means connected with the supply space of said last mentioned support pad and being adapted to deliver compressed gaseous fluid thereto under the control of said valve means.

26. In combination with a relatively planar platform defining the reference plane of a photogrammetric viewing system, a transport system including rotation-constraining guidance structure defining a pair of axes and including a fixedly located track forming one such axis and a rail forming the other such axis and being supported adjacent one end portion thereof by said track for longitudinal movements therealong, a frame adapted to receive a photographic transparency or the like thereon and being connected with said rail for longitudinal movements therealong, a plurality of support pads one of which is carried by said rail adjacent the other end thereof and the remainder of which are carried by said frame, each of said support pads having a plane-defining undersurface in juxtaposition with said platform and each being provided with both a supply space and along such undersurface thereof with a relatively narrow annular channel in flow communication with said supply space and providing an escape for pressurized gaseous fluid therefrom, the surface area of each of said channels through which such fluid escapes being materially less than the area of the undersurface of the associated pad interiorly of the channel, conduit means connected with each of said supply spaces and being adapted to deliver compressed gaseous fluid thereto, and valve means for controlling the flow of such fluid to said supply spaces, the escape of such gaseous fluid through said channels being effective in one condition of said valve means to elevate said pads above said platform and thereby afford relatively free movement of said transport system with respect thereto.

27. The combination of claim 26 in which the channels are endless in each of said support pads carried by said frame, the channel of said support pad carried by said rail comprising a plurality of discontinuous angular segments.

28. The combination of claim 27 in which the support pad carried by said rail is supported for pivotal movements so that the undersurface thereof defines a condition of parallelism with respect to said platform, and in which the support pad carried by said rail is provided with a manifold chamber in flow communication with each of said channel segments and with restricted flow passage means establishing communication between said supply space and said manifold chamber and defining a filter to substantially prevent the admission of foreign particles carried by such fluid into said manifold chamber.

29. The combination of claim 28 in which a second frame and support pad composition is provided, the frame of which is connected with said rail for movements along the length thereof, and in which releasable and adjustable fastener structure is provided having cooperative elements respectively carried by each of said frames to secure the same to each other for simultaneous displacements thereof along said axes.

30. A support pad for use in elevating a structure above a platform to afford relatively free movement of such structure relative thereto, said support pad having a substantially flat undersurface provided therealong with at least three perimetrically oriented channels and having also a supply space adapted to be connected to a source of compressed gaseous fluid, said pad being provided with a plurality of ports respectively associated with said channels and establishing flow communication thereof with said supply space, the surface area of said channels through which such gaseous fluid escapes being materially less than the pad undersurface inwardly of said channels whereby such area relationship together with the flow separation of said channels provides corrective actions enforcing a condition of tip-tilt stability upon said pad.

31. The support pad of claim 30 in whch said channels are each arcuate and together describe a substantially closed annulus.

32. The support pad of claim 30 in which said pad is further provided with a manifold chamber in flow communication with each of said ports and also with restricted passage means establishing flow communication between said supply space and manifold chamber and defining a filter to substantially prevent the admission of foreign particles carried by such fluid into said manifold chamber.

No references cited.

NORTON ANSHER, *Primary Examiner.*